Figure 1:
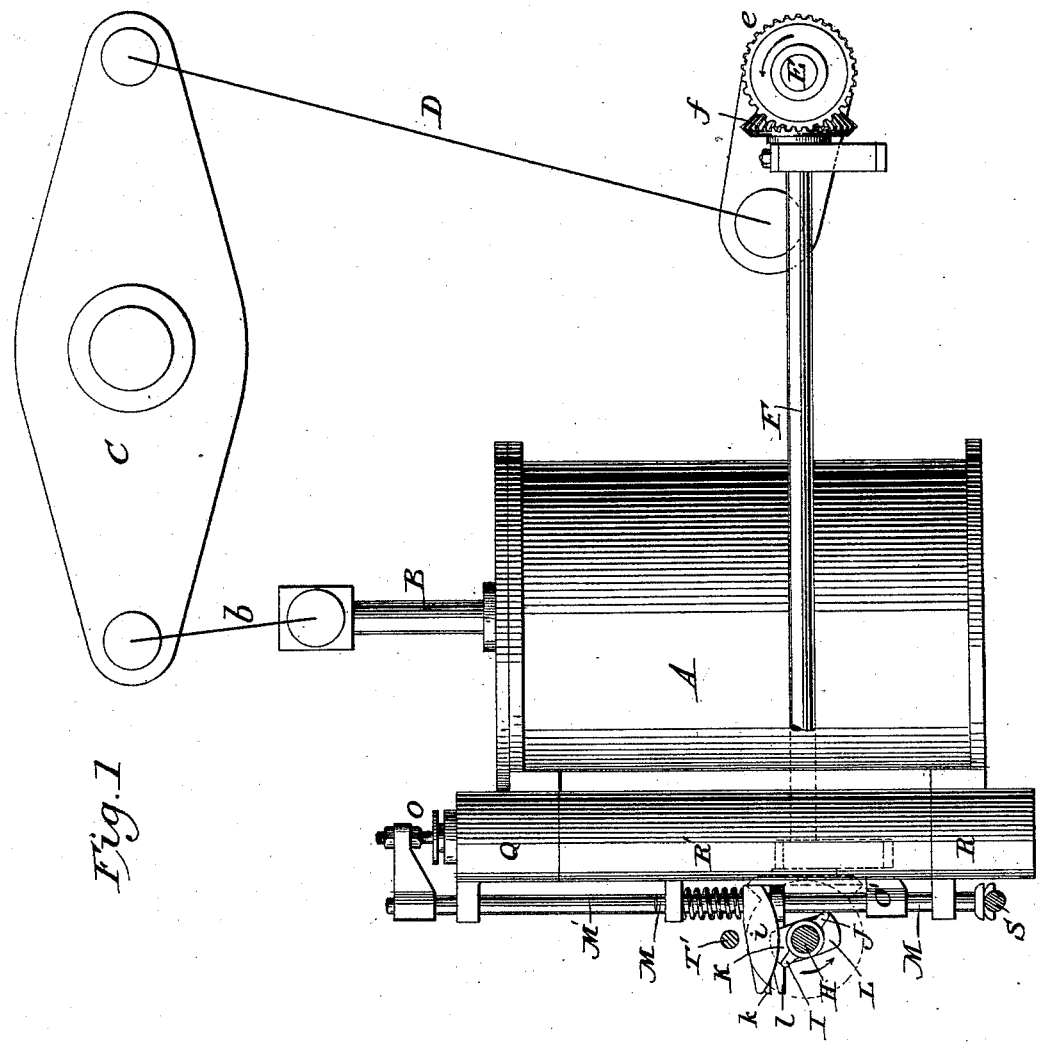
Figure 6:
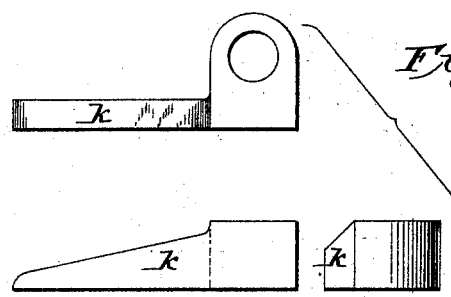
Figure 7:
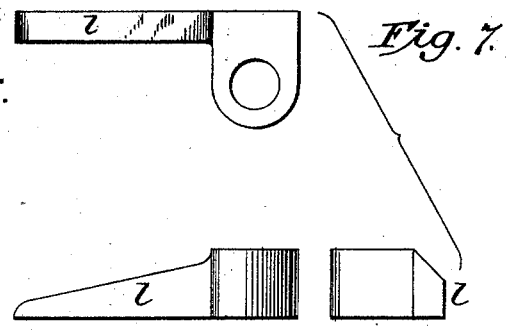
Figure 4:
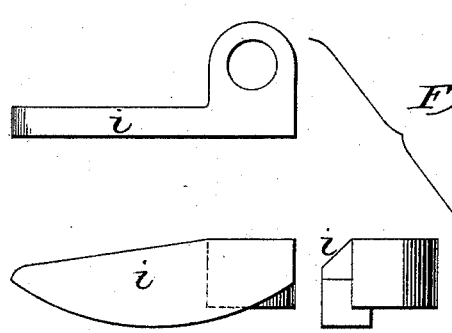
Figure 5:
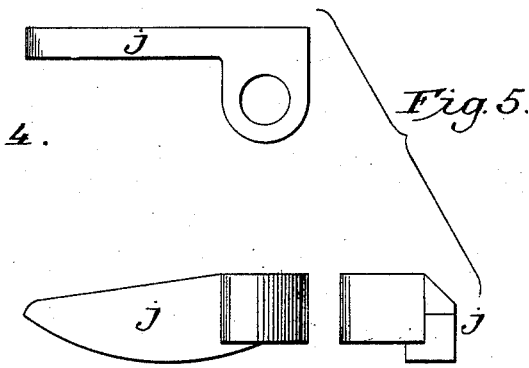

(No Model.)  5 Sheets—Sheet 1.

J. BAIRD.
VALVE GEARING.

No. 441,786. Patented Dec. 2, 1890.

Attest.
Sidney P. Hollingsworth
Baltus D. Long.

Inventor
JOHN BAIRD
by his attorneys
Baldwin Davidson & Wight (No Model.) 5 Sheets—Sheet 2.
J. BAIRD.
VALVE GEARING.
No. 441,786. Patented Dec. 2, 1890.
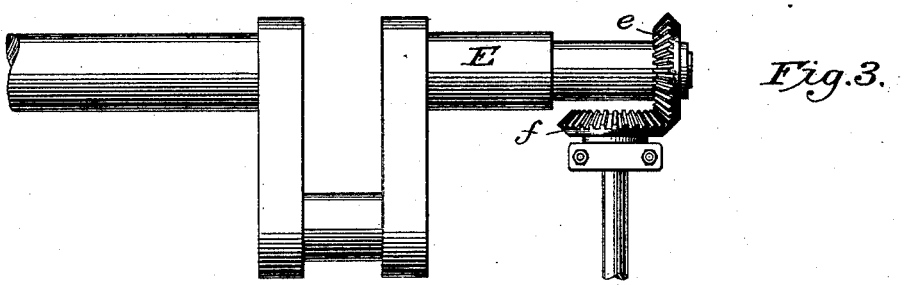
Fig. 3.
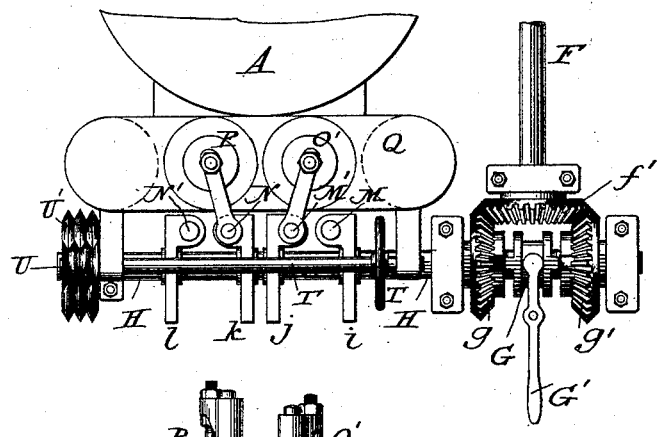
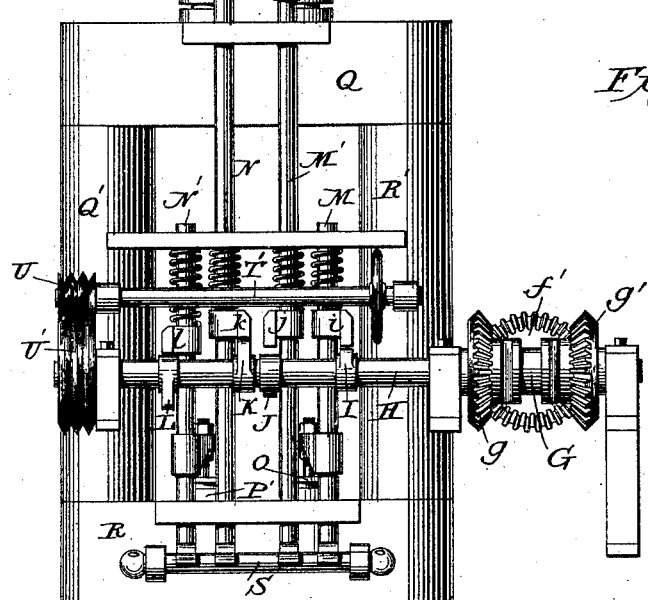
Fig. 2
Attest
Sidney P. Hollingworth
Baltus DeLong.
Inventor
JOHN BAIRD
by his attorneys
Baldwin Davidson & Wight.

(No Model.) 5 Sheets—Sheet 3.

J. BAIRD.
VALVE GEARING.

No. 441,786. Patented Dec. 2, 1890.

Attest
Sidney P. Hollingsworth
Baltus De Long.

Inventor
JOHN BAIRD
by his attorneys
Baldwin Davidson & Wight.

THE NORRIS PETERS CO., PHOTO-LITHO., WASHINGTON, D. C.

(No Model.)  5 Sheets—Sheet 4.
J. BAIRD.
VALVE GEARING.
No. 441,786.  Patented Dec. 2, 1890.
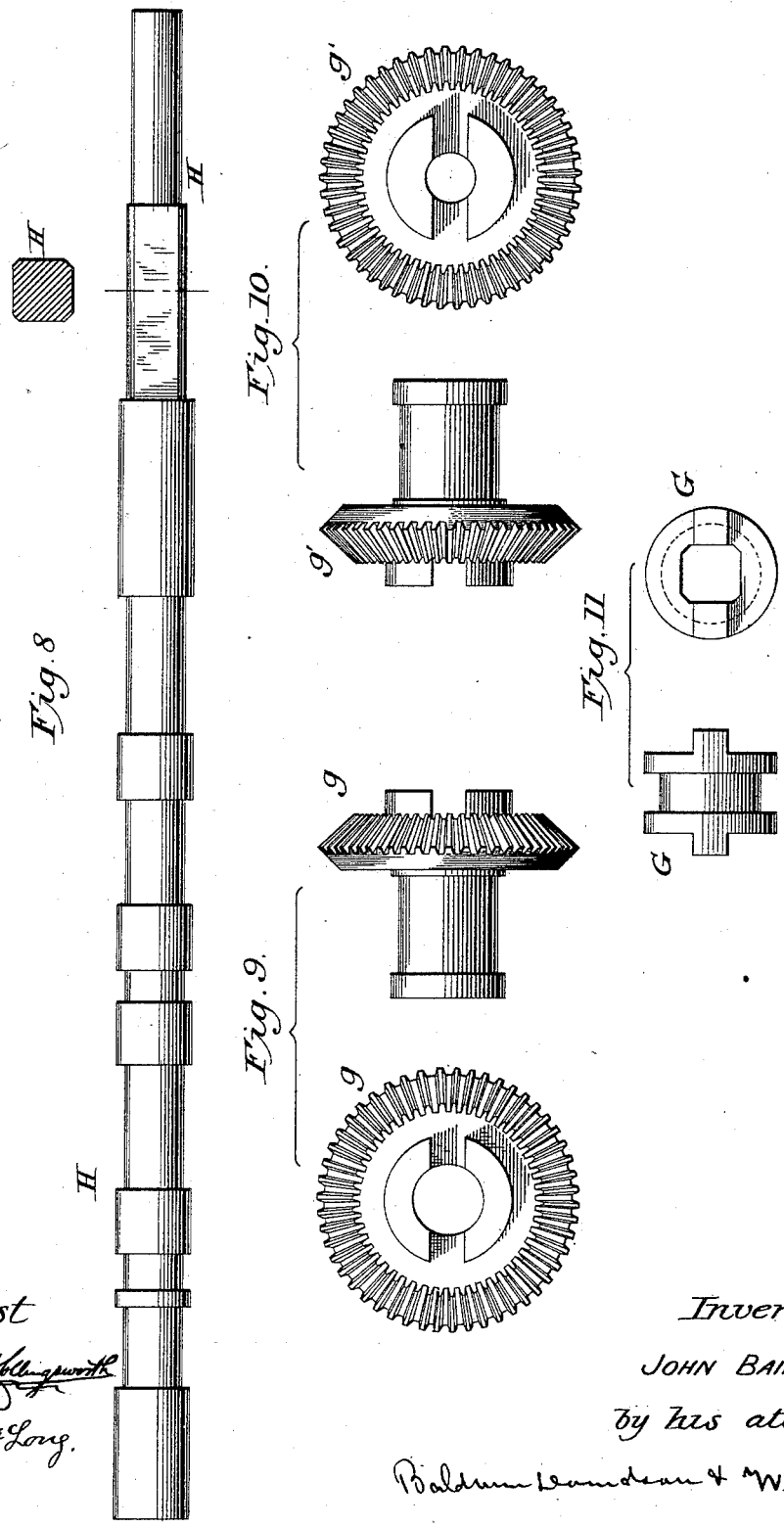
Attest
Sidney P. Hollingsworth
Baltus De Long.
Inventor.
JOHN BAIRD
by his attorneys
Baldwin Davidson & Wight.

(No Model.) 5 Sheets—Sheet 5.
J. BAIRD.
VALVE GEARING.
No. 441,786. Patented Dec. 2, 1890.
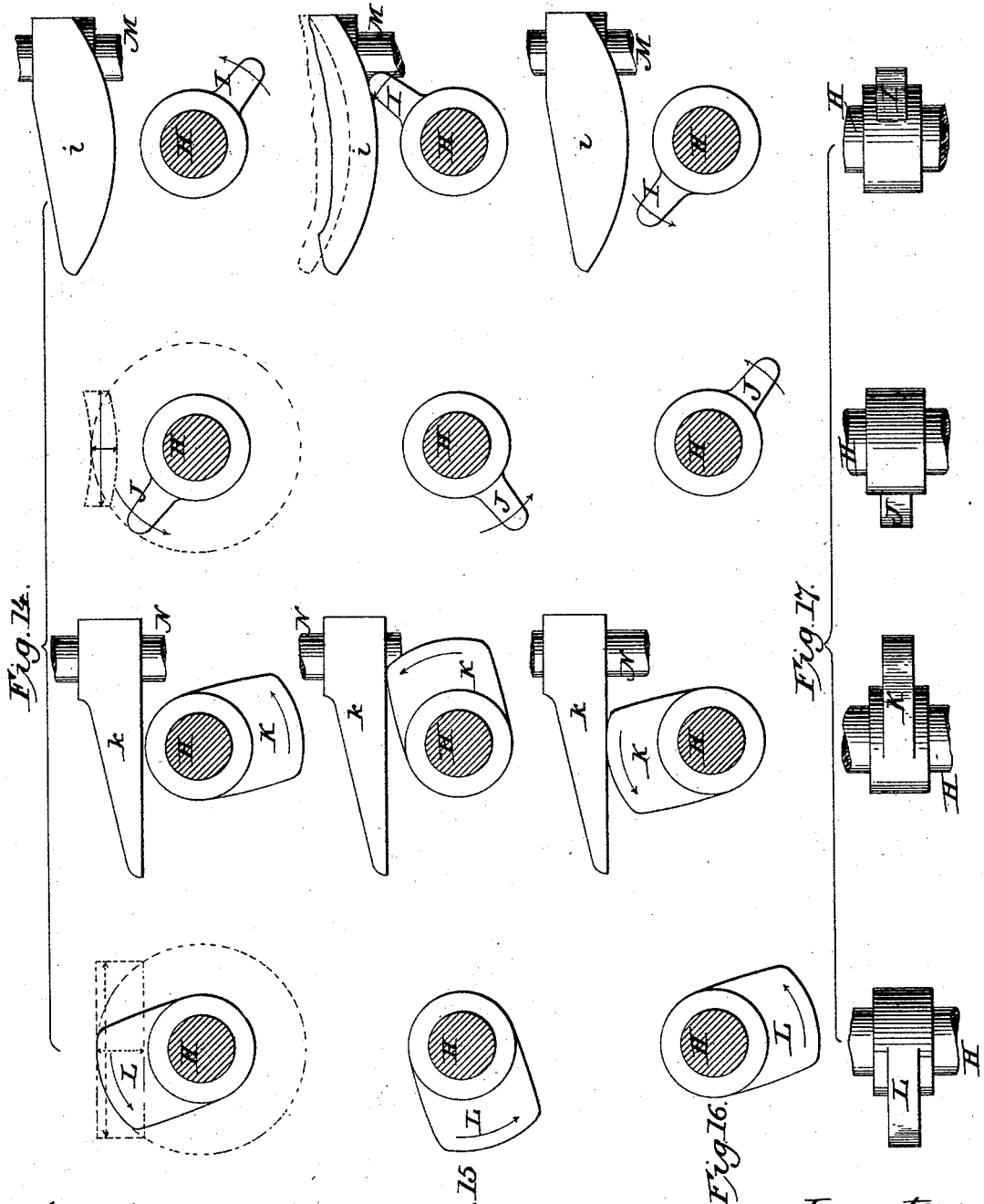
Attest.
Sidney P. Hollingsworth
Baltus De Long.
Inventor:
JOHN BAIRD
by his attorneys
Baldwin Davidson & Wight

UNITED STATES PATENT OFFICE.

JOHN BAIRD, OF NEW YORK, N. Y.

VALVE-GEARING.

SPECIFICATION forming part of Letters Patent No. 441,786, dated December 2, 1890.

Application filed August 6, 1890. Serial No. 361,154. (No model.)

*To all whom it may concern:*

Be it known that I, JOHN BAIRD, mechanical engineer, a citizen of the United States, and a resident of the city, county, and State of New York, have invented certain new and useful Improvements in Valve-Gearing for Steam-Engines, of which the following is a specification.

My invention more especially relates to that class of marine steam-engines having double-beat puppet-valves, and its principal object is to render such engines capable of running at high speed, while rendering them readily controllable or reversible and capable of readily running backward, thus rendering such engines peculiarly adaptable for screw-propulsion. This end I attain by mounting the valve-actuating tappets on a shaft rotated in one direction only by gearing from the main crank-shaft, and interposing in the train of gearing clutch mechanism adapted to hold the tappet-shaft out of gear, or to cause it to revolve always in the same direction, while the main shaft runs in either direction in order to work the engine readily backward or forward.

The subject-matter claimed is hereinafter specified.

The accompanying drawings represent so much of an upright-cylinder beam-engine as is necessary to illustrate the subject-matter constituting my improvements, some of which may be used without the others, and in engines differing somewhat in their details of construction from those herein described. That part of the engine opposite a person facing the valve mechanism I term the "front," and the opposite the "rear," end. The apparatus on the right of a person in this position I term the "right side," and the opposite the "left."

Unless otherwise indicated, the parts are of usual construction and operation.

Figure 1 is an elevation representing diagrammatically the right-hand side of the engine; Fig. 2, a front elevation thereof; and Fig. 3, a plan with parts broken away, showing the organization of the cylinder, valve-chest, valve-gearing, and crank-shaft. Figs. 4 to 13, both inclusive, represent details of the valve-actuating gearing, and Figs. 14, 15, and 16 respectively represent diagrammatically the position of the tappets on the shaft when the engine is at rest, going ahead, or running backward; and Fig. 17 shows a plan view of the tappets.

The drawings show a cylinder A, the piston-rod B of which is connected with a walking-beam C by a cross-head $b$. A connecting-rod D connects this walking-beam with a crank-shaft E, having a bevel-pinion $e$ thereon, meshing with a corresponding gear $f$, fast on a counter-shaft F, carrying a corresponding gear $f'$ on its forward edge and gearing into corresponding pinions $g$ $g'$, turning loosely, but in a fixed position, upon the tappet-shaft H. By this means these gears $g$ $g'$ are caused to rotate freely upon the tappet-shaft in opposite directions from each other. A clutch G, interposed between these gears, slides freely endwise on but turns with this shaft, being provided with a handle or shifting-lever G'. This clutch is adapted to be held in three positions: first, centrally between the pinions $g g'$, in which position it is free from engagement with both of said pinions, and the tappet-shaft H remains quiescent; second, when thrown to the left, so as to engage with the pinion $g$, the parts occupy their normal position—that is, when the engine is running forward; third, when the clutch is thrown to the right, so as to engage with the pinion $g'$, which is the proper position when the motion of the engine is reversed and the engine is working backward, under which condition the tappet-shaft still runs the same way as before.

Tappets I J K L on the shaft H act on corresponding steam-toes $i$ $j$ $k$ $l$ on the lifting-rods M M' N N', to which the steam-valves O O' P P' are connected. The upper and lower steam-chests Q R are connected by side pipes Q' R'. The valves may be of the ordinary double-beat puppet-valve variety.

S represents a trip-shaft; T, a hand-wheel on a shaft T', carrying a gear U, meshing with a corresponding gear U' on the tappet-shaft H. These are preferably friction-gears.

The exhaust-steam toes $k$ $l$ it will be observed are straight on their working-faces, while the feeding-steam toes $i j$ are convex or curved on their working-faces—that is, in this instance, their lower faces are depressed or bulged downward near the middle of their length and rise at each end. Consequently when the appropriate tappet comes in contact with the toes at one end—say the rear end—it causes its appropriate steam-valve to rise faster and higher than would be the case were the face of the toe straight on its actuating-surface, and also causes the valve to descend faster, thus opening and closing the valve more quickly than would be the case under the old organization. Great advantages are thus attained in working steam expansibly with this class of valves.

Figure 13:
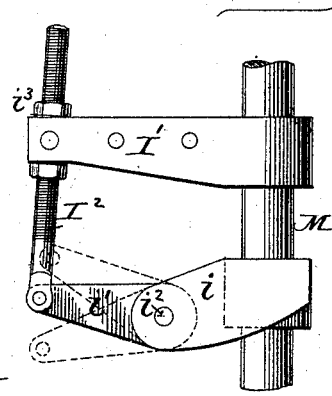
Figure 12:
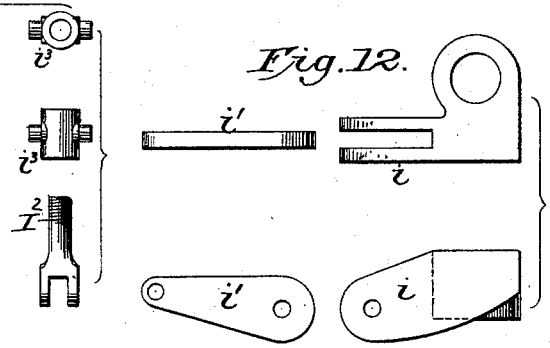

Fig. 13 shows a still further improvement in this direction, which improvement consists in making the toe in two sections $i\ i'$, united by a central pivot $i^2$, which permits the free end $i'$ to move vertically around said pivot. It can thus be adjusted and held in the desired position by means of a screw $I^2$, connected by a swivel-nut $i^3$ with a bracket $I'$, projecting from the lifter-rod M. The raising of the free end of the toe causes the steam-valve to close more quickly, and correspondingly keeps it open longer when depressed, thus enabling me to alter or regulate the cutting off of the steam from the cylinder, thus constituting a variable cut-off, actuated simply by turning the nuts on the screw-rod to raise and lower the toe. These screws may be turned by hand while the engine is in motion; or it might be done automatically by a governor of suitable construction.

The following is a description of the operation of the apparatus: Steam enters by the side pipe R' on the right side, and after passing through the valve-chests and cylinder is discharged to the condenser (not shown) from the side pipe Q' on the left side of the engine. Suppose the engine is at half-stroke, as shown in Fig. 1, the piston being about the middle of the cylinder, with the clutch in the position shown in Fig. 3— that is, in mid-gear or disengaged from both of the gears $g\ g'$—and the valve-shaft H with its tappets I J K L in the position shown in Fig. 15—that is, the one they normally occupy when the piston is at the bottom of the cylinder. Then when the signal to start the engine to go ahead is given, the engineer turns the valve-shaft or tappet-shaft H by means of the hand-wheel T and friction-gears U U' until the tappets occupy the position shown in Fig. 16. The lower steam-valve O' is then opened to admit steam to the lower side of the piston, and the upper exhaust-valve P on lifting-rod N is opened and allows the steam to escape from the opposite or upper side of the piston. The clutch G is then engaged with the bevel-gear $g$ and the engine goes ahead. The arrows show the direction of motion of the various parts, and from them it appears that in going ahead the crank-shaft and tappet-shaft revolve in the same direction. It will furthermore be seen that when backing, the crank-shaft and tappet-shaft revolve in the same direction. It is obvious that under the organization shown the tappet-shaft must always revolve in the same direction, whether the engine is going backward or forward. This, however, would not be necessary if the tappets for the steam-valves were made like the tappets for the exhaust-valves and kept the valves open the length of the stroke. In going ahead, after the tappets assume the position shown in Fig. 16 and steam is admitted below the piston, as above described, the clutch G is engaged with the gear $g$, and the parts are in correct position for continuing to work in this direction.

As the steam-tappets I J are ordinarily intended to be placed to cut off the admission of steam to the cylinder at about three-eighths of the stroke, it may happen when the clutch is thrown into gear that there may not be sufficient steam in the cylinder to work the engine. In such case the engineer admits and exhausts the steam by operating the tripshaft S until the engine is fairly going. The same operation is performed for reversing the engine as that heretofore described for going ahead, but in a somewhat different manner. The clutch being in mid-gear, the engineer turns the valve-shaft H by the hand-wheel T, thus placing the tappets in the position shown in Fig. 14, under which arrangement the steam is admitted to the upper side of the piston and exhausted from the opposite one, thus reversing the engine. The clutch G is then engaged with the gear $g'$, and the operation continues.

These improvements enable me to run an engine provided with double-beat puppet-valves rapidly backward or forward, to reverse it quickly, and to regulate the cutting off of the steam either automatically or by hand.

Having thus fully described the construction, organization, and operation of my improved steam-engine, what I claim therein as new and as of my own invention is—

1. The combination, substantially as hereinbefore set forth, of double-beat puppet-valves, a rotary shaft actuating them, gearing driving this shaft from the crank-shaft, and a clutch-coupling adapted to leave the valve-shaft free or to run it always in one direction no matter which way the crank-shaft runs.

2. The combination, substantially as hereinbefore set forth, of a crank-shaft, a rotary shaft, tappets thereon actuating toes on the lifter-rods, gearing connecting the crank-shaft and valve-shaft, and a reversing-clutch interposed in the train of gearing and adapted to throw the valve-shaft out of gear or to cause it always to run the engine forward.

3. The combination, substantially as hereinbefore set forth, of a crank-shaft, a rotary shaft, tappets thereon actuating toes on the lifter-rods, a counter-shaft, gears thereon meshing with corresponding gears on the crank-shaft and tappet-shaft, and a reversing-clutch on the latter shaft.

4. The combination, substantially as hereinbefore set forth, of a crank-shaft, a bevel-pinion thereon gearing with a corresponding pinion on a counter-shaft carrying a similar pinion fast on its forward end, a rotary shaft carrying tappets actuating toes on the lifter-rods, bevel-gears loose on this shaft and gearing with the pinion on the forward end of the counter-shaft, and a clutch-coupling interposed between the loose bevel-gears.

5. The combination, substantially as hereinbefore set forth, of a rotary valve-shaft and lifter-rods having steam-toes thereon, curved or convex on their actuating-faces quickly to open and close the valves.

6. The combination, substantially as hereinbefore set forth, of a rotary shaft, tappets thereon, puppet-valves, their lifter-rods, and steam-toes thereon, curved or convex on their actuating-faces quickly to move the valves.

7. The combination, substantially as hereinbefore set forth, of double-beat puppet-valves, their lifter-rods, steam-toes having curved or convex faces actuating the inlet-valve lifter-rods, straight-faced toes actuating the exhaust-valve lifter-rods, and a rotary shaft actuating both sets of toes.

8. The combination, substantially as hereinbefore set forth, of double-beat puppet-valves, their steam-toes having curved or convex actuating-faces, a rotary shaft actuating them, gearing driving the shaft from the crank-shaft, and a reversing-clutch.

9. A steam-toe constructed, substantially as hereinbefore set forth, of two sections connected by a pivot which permits of the adjustment of one section relatively to the other.

10. The combination, substantially as hereinbefore set forth, of a puppet-valve, its lifter-rod, and a jointed or pivoted steam-toe carried thereby.

11. The combination, substantially as hereinbefore set forth, of a puppet-valve, its lifter-rod, a jointed or pivoted steam-toe carried thereby, and a valve-shaft carrying a tappet acting on the toe.

12. The combination, substantially as hereinbefore set forth, of puppet-valves, their lifter-rods, jointed or pivoted actuating-toes carried thereby, and a rotary valve-shaft actuating them.

13. The combination, substantially as hereinbefore set forth, of a jointed or pivoted sectional steam-toe with means for adjusting its pivoted section.

14. The combination, substantially as hereinbefore set forth, of a puppet-valve, its lifter-rod, a jointed or pivoted sectional steam-toe, and means for adjusting it also carried by the lifter-rod.

15. The combination, substantially as hereinbefore set forth, of a puppet-valve, its lifter-rod, a jointed or pivoted sectional steam-toe carried thereby, a bracket or arm also on the lifter-rod, a nut turning freely therein, and a screw actuated thereby, connected with the movable section of the toe to adjust it.

16. The combination, substantially as hereinbefore set forth, of a rotary valve-shaft, a hand-wheel shaft, and friction-gearing to set the tappets and valves in position for starting.

17. The combination, substantially as hereinbefore set forth, of double-beat puppet-valves, their rotary actuating-shaft, gearing driving it from the crank-shaft, a clutch-coupling, a hand-wheel, and gearing by which the valve-shaft and valves may be adjusted for starting.

18. The combination, substantially as hereinbefore set forth, of puppet-valves, their lifter-rods, a rotary valve-shaft, gearing driving it from the crank-shaft, a clutch-coupling, and a trip-shaft adapting the valves to be worked by hand in starting.

19. The combination, substantially as hereinbefore set forth, of puppet-valves, their lifter-rods, a rotary valve-shaft, gearing driving it from the crank-shaft, gearing for adjusting the valve-shaft and valves, a clutch controlling the shaft-actuating gearing, and a trip-shaft adapting the valves to be worked by hand in starting.

20. The combination, substantially as hereinbefore set forth, of puppet-valves and their rotary actuating-shaft with mechanism for adjusting the valve-shaft and valves for working them by hand, for rotating the shaft, and for coupling or uncoupling the driving mechanism.

In testimony whereof I have hereunto subscribed my name.

JOHN BAIRD.

Witnesses:
WM. G. WARD, Jr.,
ADDISON W. BAIRD.